United States Patent
Stephenson

(10) Patent No.: US 9,939,091 B2
(45) Date of Patent: Apr. 10, 2018

(54) MODULAR PIPE CLAMP

(71) Applicant: Heath Stephenson, Rotherham (GB)

(72) Inventor: Heath Stephenson, Rotherham (GB)

(73) Assignee: AES Engineering Ltd., Rotherham (GB)

( * ) Notice: Subject to any disclaimer, the term of this patent is extended or adjusted under 35 U.S.C. 154(b) by 228 days.

(21) Appl. No.: 14/958,683

(22) Filed: Dec. 3, 2015

(65) Prior Publication Data

US 2016/0161034 A1 Jun. 9, 2016

(30) Foreign Application Priority Data

Dec. 5, 2014 (GB) .................................. 1421694.9

(51) Int. Cl.
*F16L 23/08* (2006.01)
*F16B 2/10* (2006.01)

(52) U.S. Cl.
CPC .............. *F16L 23/08* (2013.01); *F16B 2/10* (2013.01)

(58) Field of Classification Search
CPC ............ F16L 23/04; F16L 23/08; F16L 23/10
USPC ................ 285/409, 410, 411, 366, 367, 420
See application file for complete search history.

(56) References Cited

U.S. PATENT DOCUMENTS

| | | | | |
|---|---|---|---|---|
| 1,966,039 A * | 7/1934 | Muchnic | ................ | F16L 23/10 285/411 |
| 1,985,544 A * | 12/1934 | Muchnic | ................ | F16L 43/00 285/411 |
| 2,689,141 A * | 9/1954 | Kiekhaefer | ............ | F16L 23/10 285/410 |
| 3,797,836 A * | 3/1974 | Hailing | ................ | F16J 15/0887 285/367 |
| 5,454,606 A * | 10/1995 | Voss | ........................ | F16L 23/10 285/367 |
| 5,509,702 A * | 4/1996 | Warehime | ............... | F16L 23/10 285/367 |
| 5,645,303 A * | 7/1997 | Warehime | ............... | F16L 23/10 285/410 |
| 7,891,713 B2 * | 2/2011 | Bekkevold | ............. | F16L 23/08 285/410 |
| 8,465,060 B2 * | 6/2013 | Peet | ........................ | F16L 23/08 285/410 |
| 8,661,626 B2 * | 3/2014 | Peet | ........................ | F16L 23/10 24/285 |
| 2009/0096210 A1 * | 4/2009 | Maunder | ................ | F16L 23/10 285/411 |

* cited by examiner

*Primary Examiner* — David E Bochna
(74) *Attorney, Agent, or Firm* — Edwin D. Schindler

(57) ABSTRACT

A pipe clamp includes a first jaw pivotally connected to a second jaw, each jaw having a connection flange at each of its ends, in which the flanges at the pivoting end of the jaws are provided with a first locking mechanism and the flanges of the jaws distal from the pivoting end provided with second and third locking mechanisms. The second and third locking mechanisms are shaped such that, when they are in place, the combined width of the second and third locking mechanisms is less than twice the width of their widest crossways section in the same plane when not in place.

6 Claims, 3 Drawing Sheets

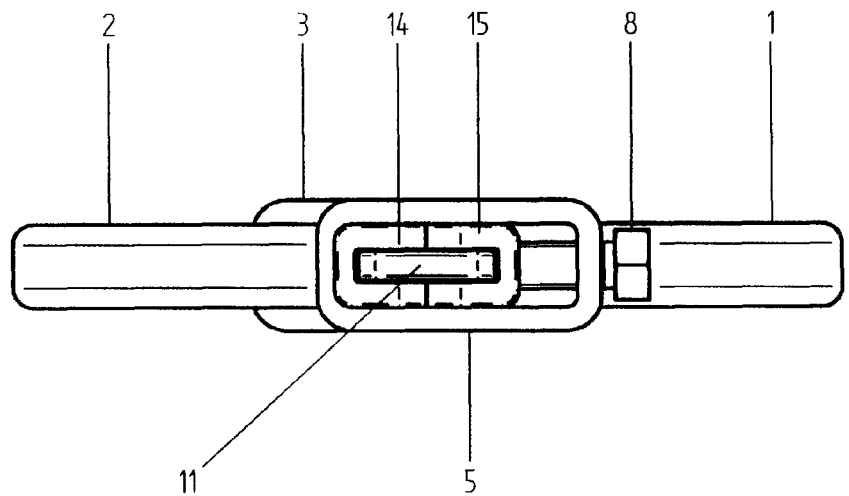
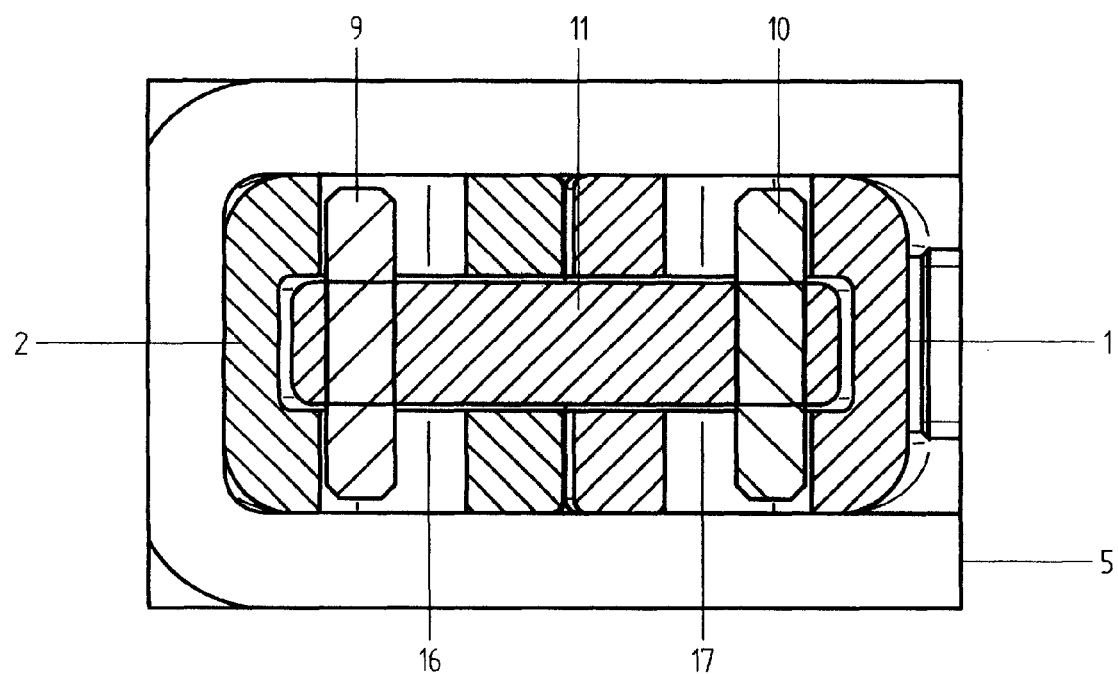

MODULAR PIPE CLAMP

BACKGROUND OF THE INVENTION

Technical Field of the Invention

The present invention relates, generally, to a pipe clamp for the purposes of sealing two pressure retaining elements together.

Description of the Prior Art

Pipes clamp are commonly used in industry to create a sealed joint between two pieces of pipe or equipment. The purpose of this is so that procedures, such as maintenance or cleaning, may be more easily carried out.

There are many different styles of pipe clamps which work in different ways and are more common to certain industries over others. Typically, in conjunction with the clamp, there are two ferrules or flanges connected to both joining sections. These ferrules interface with the clamp and allow it to pull the two sections together to create a seal, usually with the aid of a gasket. One known method is to use two interfacing angles between the ferrule and the clamp, such that the contracting movement of the clamp is translated into a perpendicular contracting force on the two adjacent sections of equipment. In addition to the ferrules and clamp, there is a gasket which fits into a grooved section between the ferrules and provides a seal. The clamp used in this style of mechanism typically has two semi-circle components, which are either hinged and bolted or double-bolted. Minimum loading torques are required on the bolts, which ensure that the clamp is appropriately shut, and maximum pressure and temperature ratings set the working limits.

There are a number of different standards and specifications which cover the design and testing of clamps. The standards cover the use of certain features, such as minimum bolt diameters, and limit them so as to ensure the strength and integrity of the design. The American Society of Mechanical Engineers ("ASME") is an organization which covers the design of pipe clamps in their standard: ASME VIII Div. 1.

Semi-circular clamp designs which adhere to such standards as ASME VIII Div. 1 typically require multiple fixing methods at each end. This is so that a level of redundancy is included in the design, reducing the potential for failure. This is often achieved by using additional bolts and/or fixing methods such as hinges. The inclusion of such precautions can result in a design with a larger footprint. Such designs can be prohibitively large in certain situations, especially when the maximum operating limits are well within the design limits of the clamp itself.

It is seen as advantageous for a pipe clamp to be able to adhere to the appropriate standards without an undue increase in its footprint.

SUMMARY OF THE INVENTION

The present invention provides a pipe clamp assembly which includes two substantially similarly-shaped arms, oriented in opposing positions, and having axial protrusions for the receiving of one or more locking mechanisms and in which the locking mechanism, containing both a displacement locking bolt and a displacement locking arm, are fitted such that the displacement locking bolt is located through a retaining orifice on the displacement locking arm and received by a bolt receiving orifice situated on the axial protrusion and, further, wherein the displacement locking bolt may be manipulated so that the displacement locking arm draws the opposing axial protrusion such that it becomes increasingly less displaced.

More particularly, according to the present invention, there is provided a pipe clamp comprising a first jaw pivotally connected to a second jaw, each jaw having a connection flange at each of its ends, wherein the flanges at the pivoting end of the jaws are provided with a first locking mechanism and the flanges of the jaws distal from the pivoting end are provided with second and third locking mechanisms. The second and third locking mechanisms are shaped so that, when they are in place, the combined width of the second and third locking mechanisms is less than twice the width of their widest crossways section in the same plane when not in place.

Preferably, the two substantially similarly shaped arms are semi-circular in nature.

More preferably, there is included on the inner facing portion of the semi-circular arms, a receiving groove shaped so that when the pipe clamp assembly is situated around a set of circumferentially similar components, henceforth referred to as ferrules, which include a radially extending portion, and where the radially extending portion is received into the receiving groove, so that the ferrules are forcibly drawn together and, where may also be included, an inversely similarly profiled toroid, shaped for being capable of fitting between the ferrules.

Preferably, two or more of the provided locking mechanisms, each comprising of the displacement locking bolt and displacement locking arm, are substantially similar. More specifically, the displacement locking arms included in the provided locking mechanisms are such that their design may be included within a common net shape.

Preferably, the provided locking mechanisms, more specifically the displacement locking arms, are shaped for allowing them to interface into a smaller space envelope.

Preferably, the provided locking mechanisms are separate to the clamp assembly in so far as they may be removed and replaced when the clamp is not in use.

Preferably, the axial protrusions and the displacement locking bolts are provided with female and male profiles that, on interfacing the two components, the displacement locking bolt may be inclined towards a substantially perpendicular position relative to the axial protrusion.

Preferably, the retaining orifice in the displacement locking arm is provided with a threaded portion and, further, where the displacement locking bolt is provided with a similarly threaded portion.

Preferably, there is provided one or more connecting elements between the two similarly-shaped arms which substantially restricts the relative movement of the two similarly-shaped arms to a single plane.

Preferably, the method by which the connecting element or elements are retained to the two similarly-shaped arms is such that the thickness of the assembly is not increased relative to the thickness prior to the inclusion of the connecting elements.

More preferably, there is included with the connecting elements a pivot arm and a pivot pin, wherein the pivot pin fixedly fits into a receiving orifice on the pivot arm and, further, where the pivot arm assembly is combined with the similarly-shaped arms so that there are held in permanent assembly.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views:

FIG. 2 is a plan view of the pipe clamp axial protrusion and single locking arm;

Figure 4:
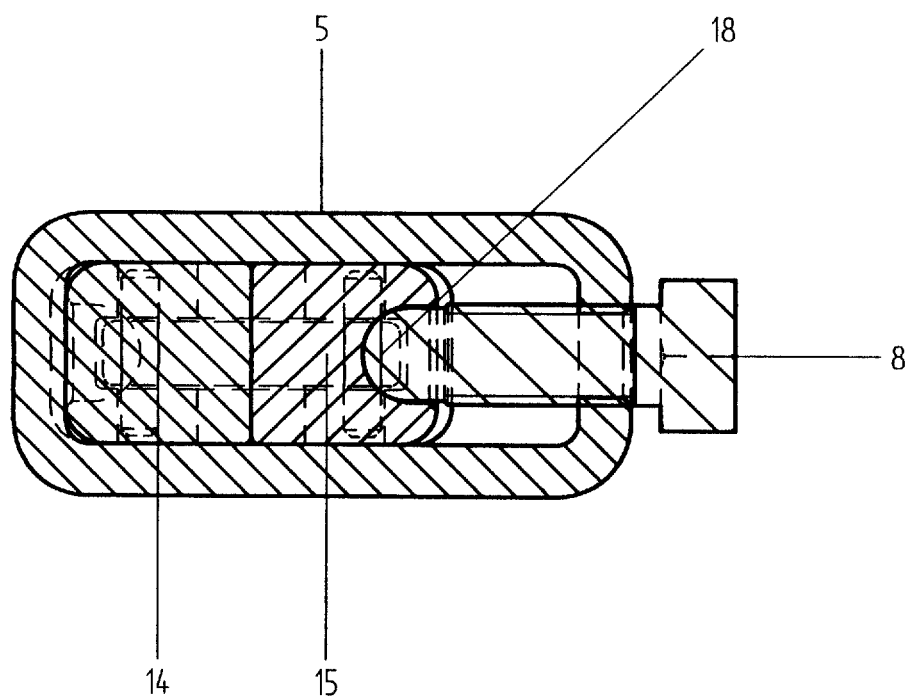

FIG. 3 is a sectional view of the hinge mechanism, encompassing pivot arm 11, and pivot pins 9 and 10; and, FIG. 4 is a sectional view of the locking arm and locking bolt profiles.

DETAILED DESCRIPTION OF THE DRAWING FIGURES AND PREFERRED EMBODIMENTS

Figure 1:
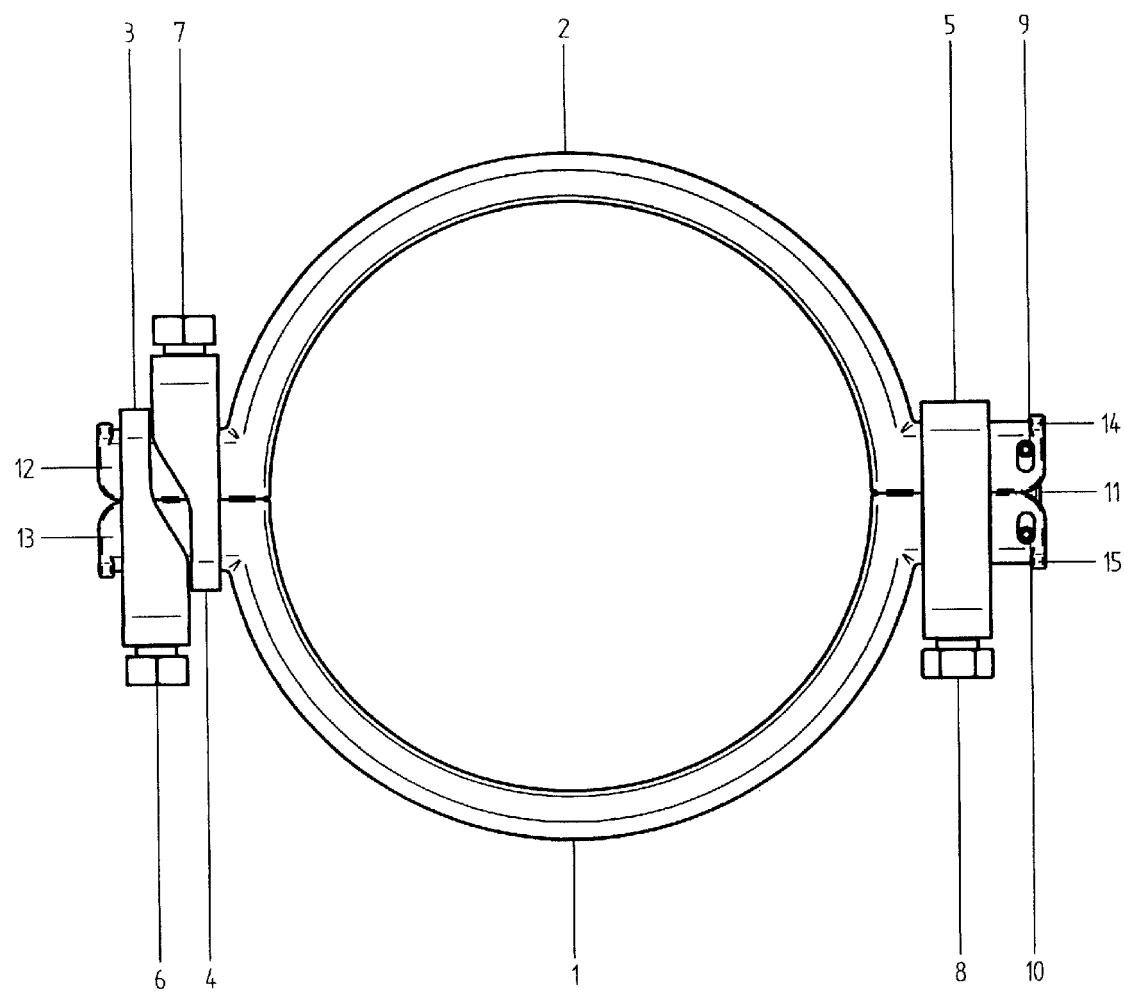
FIG. 1 is a plan view of the pipe clamp assembly according to the present invention.

The invention will now be described, by way of example only, with reference to the accompanying drawings:

Referring to FIG. 1 of the accompanying drawings, right-side clamp 1 and left-side clamp 2 are orientated to form a circular clamping profile, with clamping protrusion 12, 13 and clamping protrusion 14, 15 providing a clamping surface for the locking mechanisms, which comprises a primary locking arm 4, secondary locking arm 3, single locking arm 5, primary locking bolt 7, secondary locking bolt 6 and single locking bolt 8.

Right-side clamp 1 and left-side clamp 2 are hinged together via pivot arm 11 and pivot pins 9 and 10, whereby left-side clamp 2 and right-side clamp 1 are fixed in plane, allowing for a hinged opening, however preventing lateral movement between right-side clamp 1 and left-side clamp 2.

A clamping effect upon clamping protrusions 14, 15 is generated by single locking arm 5 and single locking bolt 8; similarly, clamping arms 12, 13 are clamped together utilizing clamping arms 3, 4 and locking bolts 6, 7.

Clamping arms 3, 4 are shaped as to create clearance and allow the arms to be installed and function in the limited space of clamping arms 12, 13.

Referring to FIG. 2 of the accompanying drawings, pivot arm 11 is positioned between clearance slots in clamping arms 14, 15. Pivot pins 9, 10 fix pivot arm 11 in said slots providing the hinge mechanism. The hinge mechanism is fully encompassed within the profile of the clamping protrusions, ensuring a flush profile to allow correct assembly for single locking arm 5 during assembly and maintenance.

The locking mechanism that secures clamping protrusions 14, 15 utilizes single locking arm 5 and single locking bolt 8, whereby single locking bolt 8 is located through a threaded hold on the single locking arm 5. The threaded hole is threaded to match the single locking bolt, allowing for the bolt and arm to perform a clamping function around clamping protrusions 14, 15.

Referring to FIG. 3 of the accompanying drawings, pivot arm 11 is secured between right-side clamp 1 and left-side clamp 2 using pivot pins 9, 10, which are fitted to pivot arm 11, with clearance holes 16, 17 incorporated into clamping protrusions 14, 15 for allowing the hinge to expand during clamp instillation and got removal when all clamping mechanisms are relieved.

Referring to FIG. 4 of the accompanying drawings, the mating profile between locking bolt 8 and clamping arm 15 is created utilizing a domed bolt end and domed locating hole 18; this ensures positive location of the locking bolt.

While only several embodiments of the present invention have been shown and described, it will be obvious to those skilled in the art that many modifications may be made to the present invention without departing from the spirit and scope thereof.

What is claimed is:

1. A pipe clamp, comprising:
   a first jaw; and,
   a second jaw pivotally connected to said first jaw with each of said first jaw and said second jaw having a connection flange at each end of said first jaw and said second jaw, wherein each said connection flange at a pivoting end of said first jaw and said second jaw has a first locking mechanism and said connection flange of each said first jaw and said second jaw being distal from said pivoting end and having a second locking mechanism and a third locking mechanism, wherein said second locking mechanism and said third locking mechanism each have a shape comprising an angled face section, whereby a width of each said second locking mechanism and said third locking mechanism narrows for at least a portion of its length.

2. The pipe clamp according to claim 1, wherein said second locking mechanism and said third locking mechanism each comprise a bolt and said connection flange of each of said first jaw and said second jaw distal from said pivoting end have apertures for receiving bolts, wherein rotation of said bolt of each of said second locking mechanism and said third locking mechanism draws said first jaw and said second jaw together.

3. The pipe clamp according to claim 1, wherein each of said first jaw and said second jaw is connected to a connection section.

4. The pipe clamp according to claim 3, wherein said first jaw is integrally connected to said connection section and said second jaw is pivotally connected to said connection section.

5. The pipe clamp according to claim 1, wherein the first locking mechanism of each of said first jaw and said second jaw comprises a bolt and said connection flange of each said first jaw and said second jaw proximal to the said pivoting end has an aperture.

6. The pipe clamp according to claim 1, wherein each said second locking mechanism and said third locking mechanism is operable in opposing directions.

* * * * *